US006422513B1

(12) United States Patent
Lewis et al.

(10) Patent No.: US 6,422,513 B1
(45) Date of Patent: *Jul. 23, 2002

(54) INFLATABLE RESTRAINT SYSTEMS FOR EJECTION FLIGHT VESTS

(75) Inventors: Donald J. Lewis; Terry W. Merrifield, both of Scottsdale, AZ (US)

(73) Assignee: Goodrich Corpration, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/644,162

(22) Filed: Aug. 22, 2000

Related U.S. Application Data
(60) Provisional application No. 60/151,869, filed on Aug. 31, 1999.

(51) Int. Cl.[7] ................................................ B64C 1/00
(52) U.S. Cl. .......................... 244/122 AG; 2/6.1; 2/6.2; 2/413
(58) Field of Search .................... 244/122 AG, 121; 2/6.1, 6.2, 6.3, 411, 413

(56) References Cited

U.S. PATENT DOCUMENTS

| 4,437,628 | A | * | 3/1984 | Schwartz | ............. 244/122 AG |
| 4,734,072 | A | * | 3/1988 | Lastnik | ........................ 441/105 |
| 5,402,535 | A | * | 4/1995 | Green | ................................ 2/2 |

* cited by examiner

Primary Examiner—J. Woodrow Eldred
(74) Attorney, Agent, or Firm—Jerry J. Holden

(57) ABSTRACT

One or more tubular inflatables are mounted in pockets spaced around a flight vest to assist and maintain upper body stiffness during ejection. The inflatables function to maintain the body stiff and prevent its moving from side to side during ejection. By proper positioning of the inflatables around the body, spinal compression may be prevented. In addition, connected to the flight vest is a collar-like inflatable that supports and protects the neck and head of the air crewmember from moving. The collar-like member can encircle the neck like a scarf. In another embodiment, it can also extend above the shoulders and completely encircle the helmet holding the head in a vertical position. In each embodiment, the collar-like member properly maintains the center of gravity of the air crewmember on the aircraft seat.

14 Claims, 4 Drawing Sheets

INFLATABLE RESTRAINT SYSTEMS FOR EJECTION FLIGHT VESTS

CROSS REFERENCE TO RELATED PROVISIONAL APPLICATION

This Nonprovisional application claims the filing date of a Provisional Application having Ser. No. 60/151,869 filed on Aug. 31, 1999, titled "Inflatable Restraint Systems for Ejection Flight Vests".

FIELD OF INVENTION

This invention relates to aircrew ejection in general and more particularly to inflatable devices located in the air crewmember's flight vest for securing the air crewmember safely during ejection.

BACKGROUND OF THE INVENTION

Of major concern when a fighter aircraft is disabled in the air, is ejecting the crewmembers safely. In fighter aircraft, the air crewmembers initiate the process of ejection by pulling on an ejection handle, squeezing an ejection handle or some similar device to initiate ejection. The canopy that encloses the air crewmembers inside the aircraft cockpit is first blown or cut away. Next, the seat ejects out of the aircraft by a ballistic catapult along guide rails and the seat and air crewmember sitting thereon begins to enter the windblast. After the seat separates from the guide rails, it is propelled clear of the aircraft by rocket motors. When the seat reaches a safe trajectory, a parachute deploys for returning the air crewmember to the earth. The seat is stripped from the aircrew member and falls back to earth.

The proper positioning of the air crewmember in his seat is necessary for a safe ejection from the aircraft. Such a positioning is requires that the air crewmember is correctly aligned in his seat and that his arms and legs are safety stowed. Many factors affect positioning such as the attitude of the plane, is it flying straight, level and upright or is it in some other position?

A system identified as Inflatable Body and Head Restraint System, "IBAHRS" has been proposed which provides a pair of inflatables inside the vertical harness that extends from the five point rotary buckle to each shoulder. IBAHRS is a passive system that automatically tightens the harness at the onset of the crash. The inflatable pretensions the straps and forces the occupant back against the seat. This action lessens the chances of the air crewmember from striking cockpit objects during the emergency.

On every air crewmember, be they in a fixed wing or a rotary wing aircraft, each air crewmember wears a flight vest that is customarily sized to fit the air crewmember. Thus, a 5-percentile air crewmember does not wear a flight vest for a 95-percentile air crewmember. When working with inflatables, this requires some customizing of the flight vests without reaching the detail as required by astronauts.

SUMMARY OF THE INVENTION

It is a principal advantage of the present invention to position an air crewmember in his ejection seat before the time the seat starts moving out of the aircraft.

It is yet another advantage of the present invention to ensure that an air crewmember is securely position during ejection to avoid or reduce injury to the air crewmember.

It is yet another advantage of the present invention to provide inflatables in a flight vest that are inflated in concert with the start of the ejection sequence to position the air crewmember in the ejection seat maintaining the proper center of gravity of the seat.

It is still another advantage of the present invention to provide spine and body stiffening to the air crewmember by inflatables stowed in the flight vest.

These and other advantages are found in the following drawings and detailed description of an inflatable restraint system for flight vests to be worn by an air crewmember. The restraint system has a flight vest. Connected adjacent to the neck opening of the flight vest is a tubular inflatable initially folded to encircle the neck opening and to lie flat. The inflatable has at least one inlet adapted to receive inflation fluid. A frangible cover covers the folded inflatable, is adapted to be connected to the flight vest, and operates to rupture when the inflation fluid inflates the inflatable. A source of inflation fluid is connected in fluid communication with the inlet. An ejection system that is activated by an air crewmember generates an ejection signal that is supplied to a control unit. The control unit is electrically connected to the source of inflation fluid and responds to the ejection signal to initiate flow of the inflation fluid to the inlet.

BRIEF DESCRIPTION OF THE DRAWINGS

These and other advantages will become apparent from the detailed description and the following drawings in which.

DETAILED DESCRIPTION OF THE PREFERRED EMBODIMENTS

Figure 1:
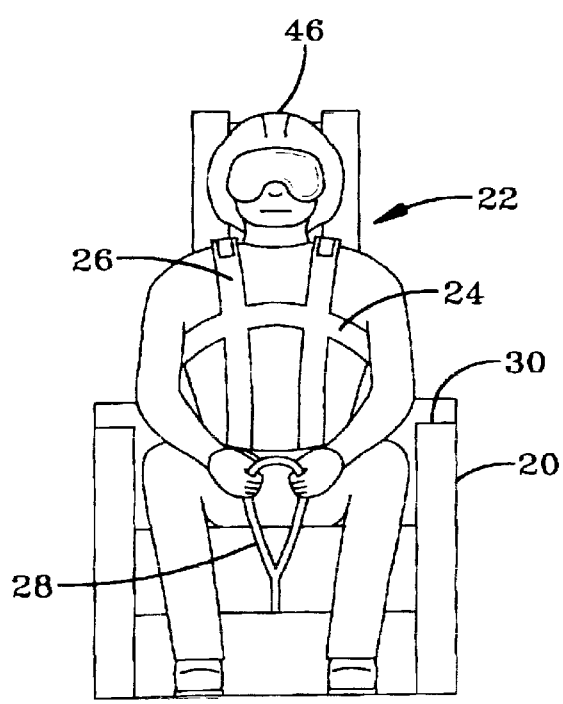
FIG. 1 is a front view of an air crewmember in an ejection seat.
Figure 2:
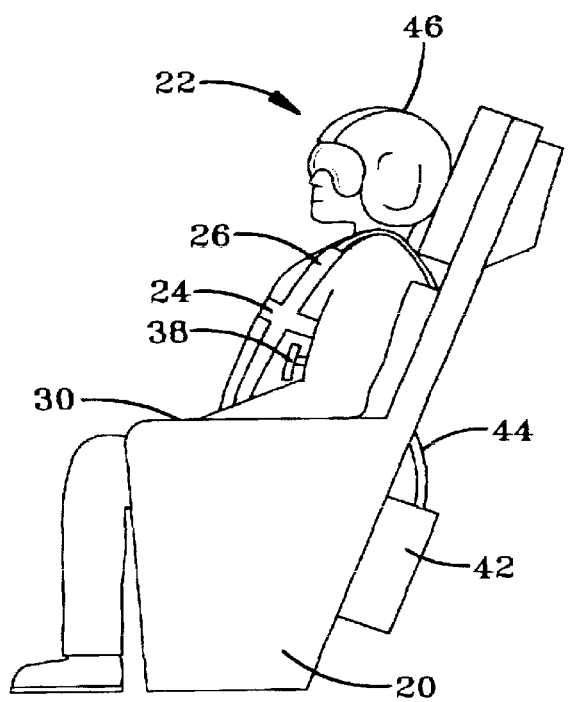
FIG. 2 is a side view of FIG. 1.

Referring to FIG. 1 there is illustrated an air crewmember 22 in an aircraft seat 20. In this Fig., the air crewmember 22 is secured to the seat by various belts and harnesses such as chest harness 24, shoulder harness 26, collectively hereinafter called harnesses. It is the function of such harnesses to keep the air crewmember 22 in the seat and to prevent him/her from hitting various equipment in the cockpit during normal flying maneuvers. The harnesses allow the air crewmember 22 to move his body while operating the aircraft.

The air crewmember 22 has to eject from the plane or aircraft due to plane having a failure in one or more of its mechanisms. The air crewmember 22 pulls on the ejection handle 28 or activates some other ejection device. Other such ejection devices are actuating levers or handles on the armrests 30 of the aircraft seat 20. From that moment on, the control systems in the plane and on the aircraft seat 20, prepare the air crewmember 22 to be ejected from the aircraft. The canopy is removed, and various propelling devices such as rockets move the aircraft seat 20 out of the aircraft along one or more rails. After clearing the aircraft, a parachute deploys, the air crewmember 22 is separated from his seat 20 and the air crewmember descends safely to the ground.

The various embodiments of the inflatable restraint systems for ejection flight vests operate to protect the air crewmember during the ejection. The several inflatables are identified in the drawings and are inflated to protect the air crewmember before the seat has moved. This period is typically less than seventy milliseconds from the time of initiation of the ejection sequence. In about two hundred or more milliseconds, the air crewmember has cleared the plane and is fully in the windblast.

Figure 3:
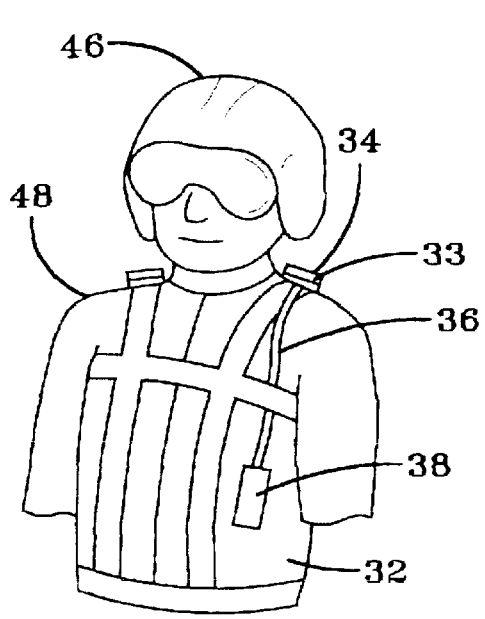
FIG. 3 is a front view of an air crewmember in a flight vest with an inflatable stored around his neck.

Referring to FIG. 3, the flight vest 32, which overlies a flight suit, has an inflatable 33. The inflatable 33 is secured to the upper portion of the flight vest 32 and is folded and stored in its own frangible cover 34 that extends around the flight vest 32. As illustrated, the folded inflatable 33 has a conduit 36 connected to a source of inflation fluid or gas such as an inflator 38 that is stored in or on the flight vest 32. The inflator 38 and the conduit 36 are stored in such a manner to not interfere with the air crewmember 22 during normal flight operations.

Figure 4:
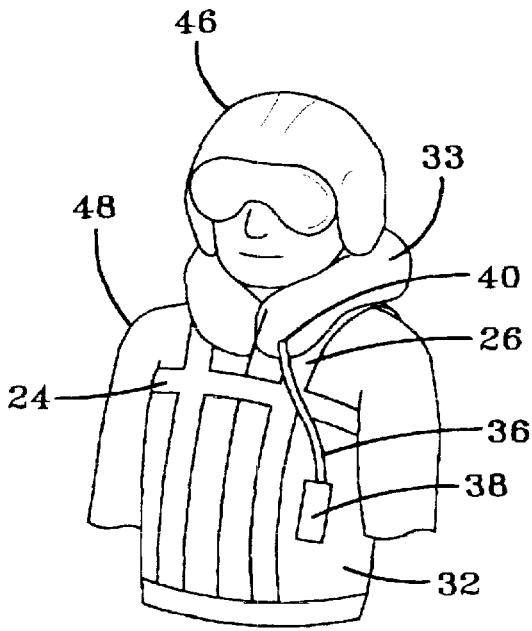
FIG. 4 is a front view of FIG. 3 of an air crewmember in a flight vest with an inflatable around his neck.

Referring to FIG. 4 the inflatable 33 has been inflated and ruptured the frangible cover 34 to form a tubular inflatable or collar-like ring positioned adjacent the neck of the flight vest 32. The storing and folding of the inflatable provides a package that is very thin and flat and is not in a position to interfere with the air crewmember's normal movements during normal flight operations.

Figure 5:
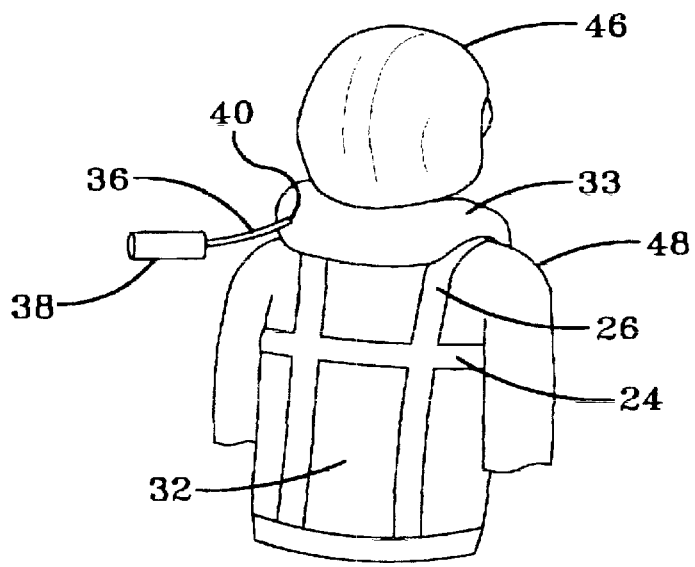
FIG. 5 is a rear view of FIG. 4.

The inflatable 33 is operatively connected via an inlet 40 in the inflatable to the conduit 36. In FIG. 5, there is illustrated a modification wherein the inflator 38 can be located in the aircraft seat or elsewhere in the aircraft and is connected to an inlet 40 in the inflatable 33 by a conduit 36.

A control unit 42, typically mounted in the aircraft seat 20, is responsive to the beginning of the ejection sequence and is electrically connected to the inflators 38 by a cable 44. When the ejection signal is generated, it is supplied from the control unit 42 by the cable 44 for actuating the inflators 38. The inflatable 33 as it is being inflated, causes the frangible cover 34 to rupture allowing the inflatable to fully inflate forming a collar-like ring around the base of the helmet 46. The inflatable 33 has sufficient internal pressure to force the head of the crewmember 22 to be aligned in the proper position and remain there even when "pushed" by the windblast. By proper positioning the air crewmember 22, the center of gravity of the seat remains in the proper position as specified.

FIG. 5 illustrates a rear view wherein the collar-like ring inflatable 33 is joined together to form a barrier to prevent the windblast from going under the helmet 46 or down in the front of the flight vest 32. The collar-like ring inflatable 33 can be contoured to join in front of the face of the air crewmember 22 but below the line of sight. In either case, the collar-like inflatable 33 bears against the shoulder 48 of the air crewmember and against the helmet 46 to deflect the windblast away from the head of the air crewmember.

If the collar-like inflatable 33 extends up beyond the eyes of the air crewmember, clear material may be used in the inflatable 33. This allows the air crewmember the opportunity to see and at the same time functions to deflect the windblast.

Figure 6:
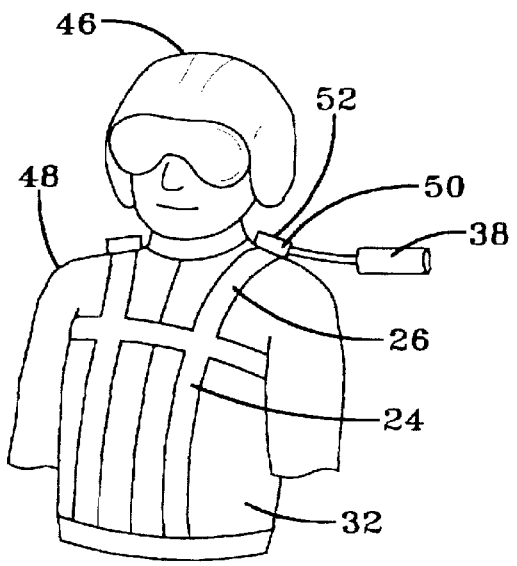
FIG. 6 is a front view of a flight vest with an inflatable stored around the neck.
Figure 7:
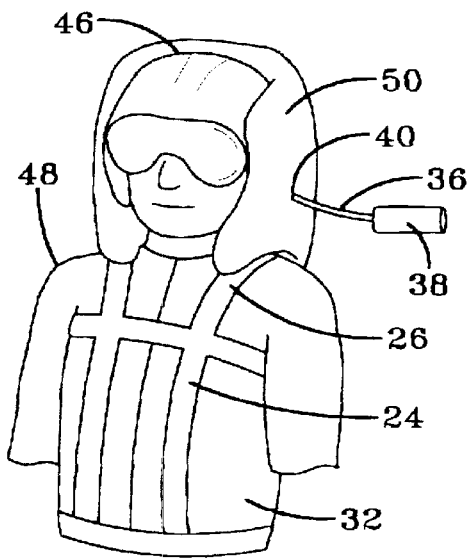
FIG. 7 is a front view of an inflatable extending alongside the helmet from the shoulder of the air crewmember.
Figure 8:
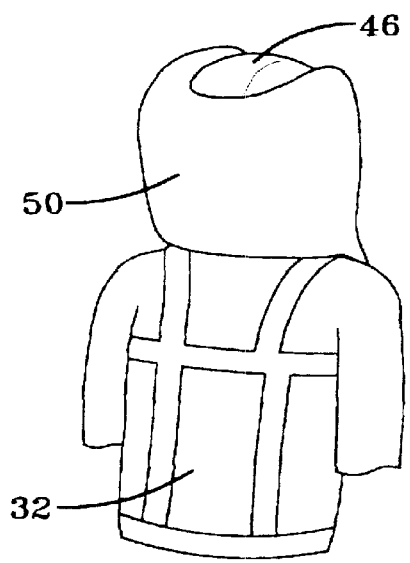
FIG. 8 is a rear view of FIG. 7.

FIGS. 6–8, is modification of the embodiment of an collar-like inflatable 50 similar to that illustrated in FIGS. 3–5. However, the height of the inflatable 50 above the shoulders 48 extends proximate the top of the helmet 46. This inflatable 50 provides a support around the helmet 46, hence the head of the air crewmember 22. In addition, this inflatable 50 is a barrier for deflecting the windblast away from the head area of the air crewmember. This inflatable 50 can be inflated to close together the ends of the inflatable 50 so that the windblast will not reach the head of the air crewmember. Clear material can be used allow the view of the air crewmember.

In any and all of the inflatables illustrated in the Figs., a piece of hook and eye material, such as Velcro or other similar material may be placed on the surfaces that abut and are to be joined. In these fabrications, reliance upon the inflation pressures in the inflatable 33, 50 holds the ends of the inflatable together.

The collar-like member illustrated in FIGS. 3–5 and the collar-like member illustrated in FIGS. 6–8 may be fabricated together. The resulting inflatable is secured to the top of the flight vest 32 around the neck line. It is folded and stored in a frangible cover 34 and has an inlet 40 and a conduit 36 for receiving inflating fluid as in the previous described inflatables. Since the inflatable 33, 50 is secured to the vest, the inflatable stays with the air crewmember 22 during ejection.

Figure 9:
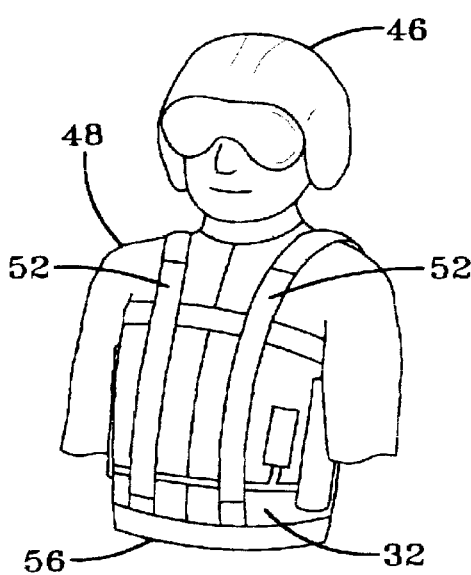
FIG. 9 is a front view of a flight vest with several inflatables stored around t he flight vest.
Figure 10:
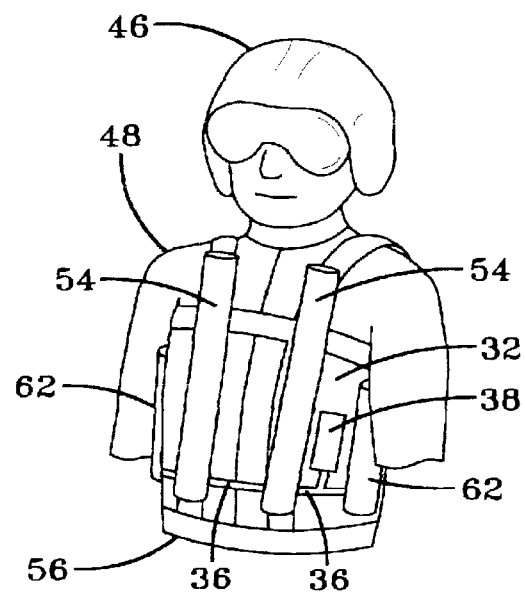
FIG. 10 is a front view of a flight vest with several vertically extending inflatable ribs.
Figure 11:
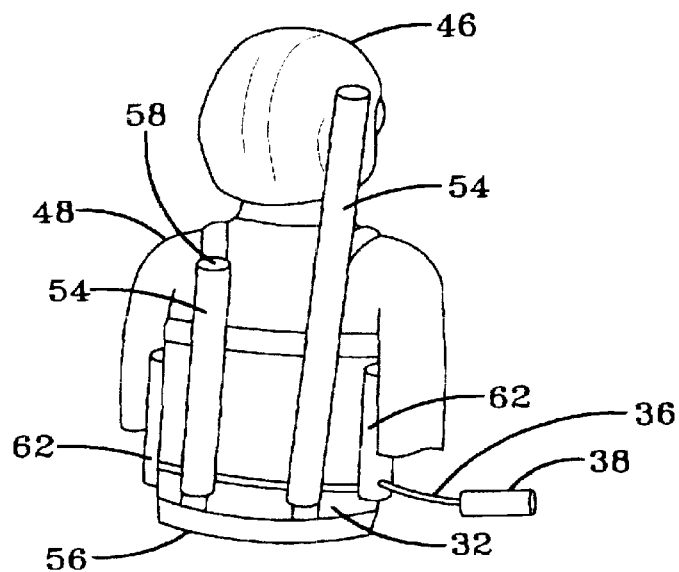
FIG. 11 is a rear view of FIG. 10 with one inflatable modified to extend to the helmet.

Referring to FIGS. 9–11, positioned around the flight vest 32 in pockets 52 formed in the flight vest, are several tubular inflatable members 54. The pockets 52 are generally vertical on the flight vest 32 and are expandable pockets. The pockets 52 expand when the tubular inflatable members 54 that are stored therein receive inflatable fluid. When the air crewmember is in the ejection sequence, the tubular inflatables 54 inflate and provide stiffening to the air crewmember holding his/her spine in a vertical position. Illustrated in the Figs., the tubular inflatables members 54 extend from proximate the bottom 56 of the flight vest 32 to proximate the neck. In the alternative, the tubular inflatables members 58 on the back, FIG. 11, could extend to or above the bottom of the helmet 46 holding the head from moving backward. In this instance, the end of the pockets is enclosed with a frangible cover 60 that ruptures under the force of the tubular inflatable 56 being inflated.

Illustrated in FIGS. 10 and 11, there are several tubular inflatables 54, only one 62 is shown, between the bottom 56 and the armpit of the flight vest that when inflated will hold the air crewmember from sidewise bending. Likewise, the other side of the flight vest or suit will have the same number of tubular inflatables 62.

In addition, in FIGS. 9, 10, there are shown at least two tubular inflatables 54, one on each side of the vest opening. When inflated these will prevent the upper part of the body from bending over. These tubular inflatables 54 can extend over the shoulder and meet with the tubular inflatables on the back of the flight vest. The reference to tubular means that any size or shaped inflatable that will be positioned on the flight vest 32 and function as described herein.

The function of the tubular inflatables 54, 56, 58, 62 in FIGS. 9–11, is to stiffen the spine of the crewmember 22. Depending on the diameter and the amount of pressure in the inflatables, the stiffness will be such that the windblast will not deflect the tubular inflatables. The number, length and placement of the tubular inflatables will depend on the degree of stiffening, the size of the flight vest, i.e. is it for a five or ninety-five percentile crewmember, etc.

The tubular inflatables 54, 56, 58, 62 are folded and stored in vertically extending pockets 52 on the flight vest 32. When the inflatables 54, 56, 58, 62 are not inflated, the thickness of the inflatable and the pocket 52 will not affect any movement of the air crewmember in carrying out his/her duties during normal flight. Positing a tubular inflatable on each side of the spine, as illustrated in FIGS. 9–11, firm spinal stiffness is accomplished.

The flight vest 32 will stay with the air crewmember all through the ejection process and will assist and protect the air crewmember as he/she descends to the ground under the parachute.

Its own inflator or gas generator that is located in the inflatable or the flight vest can power any and all of the above inflatables. In the alternative, the inflatables can be powered from a manifold portion of the gas distributor that distributes the gas for ejection. Another means of inflation may be a central gas generator mounted on or in the aircraft seat. The power to ignite the gas generator can be from a small power source connected to the inflator that is powered by a very long-life battery and be completely self-contained. Other power sources can come from the aircraft itself. All of these are potential sources in as much as these inflatables are inflated at the initiation of the ejection sequence and before the aircraft seat moves.

Using the same inflator mechanism for all the inflatables and by proper manifolding, every inflatable will inflate at substantially the same time.

There has thus been shown and illustrated the use of tubular inflatable mounted in frangible covers in a flight vest to assist and maintain upper body stiffness during ejection. In addition, connected to the flight vest is a collar-like inflatable that supports and protects the neck and head of the air crewmember from moving. The collar-like member can encircle the neck like a scarf. It can also extend above the shoulders and completely encircle the helmet holding the head in a vertical position. In each embodiment, the collar-like member properly maintains the center of gravity of the air crewmember on the aircraft seat.

What is being claimed is:

1. An inflatable restraint system for a flight vest adapt d to be worn by an air crewmember, the restraint system comprising:

a flight vest;
a tubular inflatable connected to said flight vest adjacent the neck opening, said inflatable having at least one inlet adapted to receive inflation fluid, said inflatable initially folded to encircle the neck opening and to lie flat;
a frangible cover covering said folded inflatable, said cover adapted to be connected to said flight vest and operable to rupture when said inflatable is inflated by the inflation fluid;
a source of inflation fluid adapted to be connected in fluid communication with said inlet;
ejection system activated by an air crewmember for generating an ejection signal; and
a control unit electrically connected to said source of inflation fluid and responsive to said ejection signal to initiate flow of said inflation fluid to said inlet.

2. An inflatable restraint system for a flight vest according to claim 1 wherein the air crewmember wears a helmet on the air crewmember's head,
said inflatable is positioned alongside and on each side of the helmet to center the head of an aircrew member and to provide restraint to keep the head from lateral movement.

3. An inflatable restraint system for a flight vest according to claim 2 wherein said inflatable is responsive to said inflation fluid to extend from the top of the flight vest to encircle the helmet to support and maintain the head of the air crewmember aligned with the center of gravity of the aircrew member.

4. An inflatable restraint system for a flight vest according to claim 1 wherein said ends of said tubular member join together forming a barrier preventing the windblast from getting into the flight vest.

5. An inflatable restraint system for a flight vest according to claim 1 wherein said frangible cover when ruptured operates to guide said inflatable around the neck of the flight vest.

6. An inflatable restraint system for a flight vest according to claim 1 wherein said source of inflation fluid is at least one inflator mounted in said flight vest.

7. An inflatable restraint system for a flight vest according to claim 1 wherein said source of inflation fluid is at least one inflator mounted in the aircraft seat and connected to said inlet by a conduit.

8. An inflatable restraint system for a flight vest adapted to be worn by an air crewmember, the restraint system comprising:

a flight vest;
a plurality of vertically extending expandable pockets in said flight vest, said pockets spaced around said flight vest and extending from the bottom of the flight vest;
a tubular inflatable member located in each of said pockets, each of said inflatable members being folded and lying flat in said pockets, each of said inflatable members interconnected in fluid communication with an inlet adapted to receive inflation fluid;
a source of inflation fluid adapted to be connected in fluid communication with each said inlet;
ejection system activated by an air crewmember for generating an ejection signal; and
a control unit electrically connected to said source of inflation fluid and responsive to said ejection signal to initiate flow of said inflation fluid to said inlets;

wherein each of said tubular members upon being inflated provide a stiff tubular member resisting any bending movement of said flight vest for holding the spine of the air crewmember rigid.

9. An inflatable restraint system for a flight vest adapted to be worn by an air crewmember according to claim 8, wherein at least two of said pockets and tubular inflatable members extend from the bottom of the flight vest to the bottom of the armpit opening in said flight vest for preventing sidewise bending of said flight vest.

10. An inflatable restraint system for a flight vest adapted to be worn by an air crewmember according to claim 8, wherein at least two of said pockets and tubular inflatable members extend from the bottom of said flight vest to the neck opening of said flight vest on the back side of said flight vest.

11. An inflatable restraint system for a flight vest adapted to be worn by an air crewmember according to claim 10, wherein said at least two tubular members extend from the bottom of the vest to the top of the helmet of the air crewmember for restraining the helmet, and said pockets containing said at least two tubular members has a frangible cover adapted to rupture under the inflation of said tubular members.

12. An inflatable restraint system for a flight vest adapted to be worn by an air crewmember according to claim 8, wherein at least two of said pockets and tubular inflatable members extend from the bottom of said flight vest to the neck opening of said flight vest on the front side of said flight vest, wherein said two pockets are positioned on each side of the opening of said flight vest for maintaining said flight vest rigid when said inflatables are inflated.

13. An inflatable restraint system for a flight vest according to claim 8 wherein said source of inflation fluid is at least one inflator mounted in said flight vest.

14. An inflatable restraint system for a flight vest according to claim 8 wherein said source of inflation fluid is at least one inflator mounted in the aircraft seat and connected to said inlet by a conduit.

* * * * *